US005608769A

United States Patent [19]

Patton et al.

[11] Patent Number: 5,608,769

[45] Date of Patent: Mar. 4, 1997

[54] PAUSE TESTING CIRCUIT FOR DISHWASHER CONTROLLER

[75] Inventors: James A. Patton, Goldsboro; Allen B. Daughtry, Pikeville, both of N.C.

[73] Assignee: White Consolidated Industries, Inc., Cleveland, Ohio

[21] Appl. No.: 531,516

[22] Filed: Sep. 21, 1995

[51] Int. Cl.[6] .......... G01F 15/00

[52] U.S. Cl. .......... 377/20

[58] Field of Search .......... 377/20

[56] References Cited

U.S. PATENT DOCUMENTS

| | | | |
|---|---|---|---|
| 2,494,352 | 1/1950 | Moyer et al. | 175/381 |
| 2,877,405 | 3/1959 | Morton | 324/28 |
| 3,199,525 | 8/1965 | Jellies | 137/107 |
| 3,235,794 | 2/1966 | Henderson | 324/28 |
| 3,790,761 | 2/1974 | Crabtree | 235/92 PD |
| 3,922,889 | 12/1975 | Karklys | 68/12 R |
| 4,389,709 | 6/1983 | Knibiehler et al. | 364/551 |
| 4,525,608 | 6/1985 | Cushing | 200/38 R |
| 4,559,959 | 12/1985 | Meyers | 134/56 D |
| 4,741,353 | 5/1988 | Milocco | 137/119 |
| 4,751,721 | 6/1988 | Wissell | 377/20 |
| 4,890,306 | 12/1989 | Noda | 377/15 |
| 5,029,188 | 7/1991 | Lexa | 377/20 |
| 5,264,043 | 11/1993 | Milocco | 134/25.2 |
| 5,295,172 | 3/1994 | Liu | 377/15 |

*Primary Examiner*—Margaret Rose Wambach
*Attorney, Agent, or Firm*—Pearne, Gordon, McCoy & Granger

[57] ABSTRACT

A test circuit determines state of an electrical element supplied with alternating current and measures the duration of that state. The test circuit is connected to the element so that current flows to the test circuit when the element is in the state being measured. The test circuit rectifies the alternating current to periodic pulses, which are counted to determine the duration of the current and, thus, the state. The circuit is particularly useful for testing operation of a dishwasher pump motor that is interrupted periodically. The test circuit is connected to auxiliary contacts that open and close in correspondence with the operation of the pump motor.

15 Claims, 1 Drawing Sheet

PAUSE TESTING CIRCUIT FOR DISHWASHER CONTROLLER

BACKGROUND OF THE INVENTION

1. Field of the Invention

This invention relates generally to the field of electrical testing and specifically to a test circuit for measuring the duration that an electrical element powered by alternating current is in a certain state.

2. Description of the Related Art

Dishwashers use a motor to operate a pump supplying fluid to objects to be washed. A common type of controller used to operate the pump motor includes a plurality of contacts or switches operated by a cam wheel. Such controllers are shown, for example, in U.S. Pat. No. 3,199,525 to Jellies, U.S. Pat. No. 4,525,608 to Cushing, and U.S. Pat. No. 4,559,959 to Meyers, incorporated herein by reference. At least one of the contacts is connected in series with the motor to control current flow to the motor from an alternating current supply. When the switch is closed, the motor runs. The switch is opened periodically to interrupt power supplied to the motor, thereby stopping the motor. Interrupted operation is particularly desirable when the pump is used to alternate water flow, as shown in U.S. Pat. Nos. 4,741,353 and 5,264,043 to Milocco, incorporated herein by reference. Interrupted operation can be accomplished with an auxiliary cam wheel as shown in U.S. patent application Ser. No. 08/383,055, incorporated herein by reference, or by electronic control. To optimize performance it is desirable to measure the duration of pump interruptions, that is, the time during which the motor switch is opened.

Test circuits for determining the duration of an event are known from U.S. Pat. No. 2,494,352 to Moyer, U.S. Pat. No. 2,877,405 to Morton, U.S. Pat. No. 3,235,794 to Henderson, U.S. Pat. No. 3,790,761 to Crabtree, U.S. Pat. No. 4,389,709 to Knibiehler, U.S. Pat. No. 4,751,721 to Wissell, U.S. Pat. No. 4,890,306 to Noda, and U.S. Pat. No. 5,295,172 to Liu. Still, the need remains for a simple test circuit adapted for measuring the duration of pump interruptions as well as the duration of the state of other electrical elements supplied with AC power.

SUMMARY OF THE INVENTION

The present invention provides a test circuit for indicating duration of a state of an electrical element having an alternating voltage of known frequency applied across the element. The test circuit includes a rectifier connected to the element to permit pulsing current from the alternating voltage to flow through the rectifier when the element is in the state being tested. A pulse counter is operatively connected to the rectifier to count pulses of the pulsing current. An indicator is connected to indicate a summation of pulses counted by the pulse counter as the duration of the state of the element.

The element is a switch and the test circuit is connected across the switch. The state of the switch being tested is the switch being open. A resistor is connected in series with the switch. A transformer has a primary winding connected across the element and a secondary winding connected to the rectifier. An isolation circuit is disposed between the element being tested and the pulse counter. An optocoupler has an input connected to the rectifier and an output connected to the counter. The indicator includes a display for displaying the duration of the state of the element and includes a recorder for recording the duration of the state of the element.

The invention also provides a washer for washing objects including a motor connected to power washer operation. A switch is connected in parallel with the motor. The switch has a state corresponding with operation of the motor and is adapted for having an alternating voltage of known frequency being applied across the switch and motor. A circuit is provided for testing duration of operation of the motor. The circuit includes a transformer having a primary winding connected across the switch and a secondary winding defining a output and a return; a resistor connected to the output of the transformer; a rectifier connected to the resistor; a pulse counter connected to the rectifier; and a display connected to display summation of pulses counted by the pulse counter as the duration that the switch is open. A power switch controls the motor and the switch is connected to operate with the power switch. The switch is open when the motor is disconnected from the alternating voltage. An optocoupler is disposed between the rectifier and the counter.

BRIEF DESCRIPTION OF THE DRAWINGS

The FIGURE shows a schematic diagram of a motor, control circuit, and test circuit according to the invention.

DESCRIPTION OF THE PREFERRED EMBODIMENTS

Figure 1:
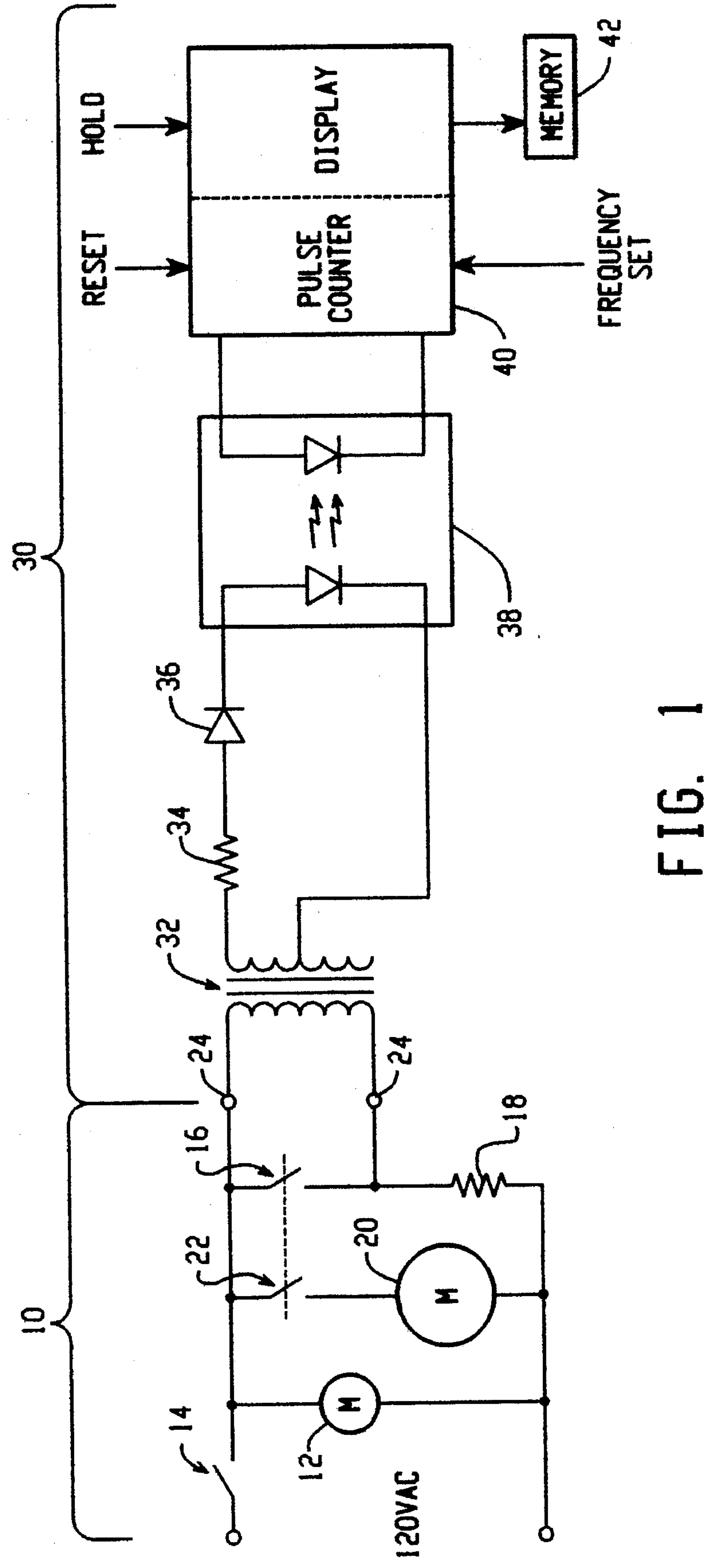

Referring to the FIGURE, an electrical system 10 of a dishwasher includes a timer motor 12 connected to a power supply, such as 120 volts, 60 Hz alternating current, through a power switch 14. An auxiliary switch 16 and a current limiting resistor 18 are connected across the timer motor 12. A value of 10 kΩ is suitable for the resistor 18. A pump motor 20 is connected to the power supply through a motor switch 22. The motor switch 22 and auxiliary switch 16 are operated by a cam wheel (not shown) powered by the timer motor 12. The motor switch 22 and auxiliary switch 16 are linked to open and close simultaneously so that the state of the auxiliary switch corresponds with an operational state of the motor 20. An auxiliary cam wheel can be provided to periodically open the motor switch and auxiliary switch. Test terminals 24 are provided at the auxiliary switch 16. If an electronic controller or other device is used, a signal corresponding to the state of the element to be tested is provided at the test terminals by suitable means.

A test circuit 30 includes a transformer 32 having a primary winding connected across the auxiliary switch 16 at the test terminals 24. The transformer 32 has a secondary winding defining an output and a return. A 12.6 volt transformer center tapped at the return to provide 6.3 volts is suitable. A current limiting resistor 34, for example, 180Ω, is connected to an output of the secondary winding of the transformer 32. A diode rectifier 36 has its anode connected to the resistor 34. An isolation circuit, such as a triac optocoupler 38 (Motorola MOC3010), has its input connected across the transformer 32 output and return in series with the resistor 34 and diode 36. An indicator such as a counter 40 (for example, a Red Lion Controls CUB3L) is connected across an output of the optocoupler 38. The counter 40 includes a pulse counter and a display. A memory 42 is connected to record data from the counter 40. The counter can also be provided with RESET, HOLD, and FREQUENCY SET inputs, as discussed below.

In operation, the power switch 14 is closed to power the timer motor 12, which moves the cam wheel thereby operating the motor switch 22 and auxiliary switch 16. When the motor switch 22 is closed, the pump motor 20 is in a "run" state and the auxiliary switch 16 is closed so that there is substantially no voltage across the test terminals 24. When the motor switch 22 is opened to interrupt operation of the pump motor 20, the auxiliary switch 16 opens and a voltage exists across the test terminals 24. The voltage at the test terminals causes a current to flow through the secondary winding of the transformer 32. The diode 36 half wave rectifies the current to provide a pulsing input to the optocoupler 38. The optocoupler sends a pulsing signal to the counter 40, which counts the pulses. When the motor switch 22 and auxiliary switch 16 are closed, the pulses stop and the counter holds the number of counted pulses.

The pulses of the pulsing signal will have the same frequency as the power supply (60 Hz), which frequency is input to the counter 40 by the FREQUENCY SET input. By dividing the number of pulses counted by the frequency, the duration of the pulsing signal in seconds is determined. The duration is indicated by a number on the display or by storing in the memory 42. The counter can be RESET to measure the duration of a subsequent signal or durations of several signals can be added to determine a total duration. The HOLD input can be activated to prevent subsequent signals from changing the duration measured. In this manner, the duration of a single interruption of pump motor operation can be determined or total off time of the pump can be measured.

The states of other electrical elements can be tested using the test circuit 30 by connecting the test circuit to alternating current supplied to the element. For example, a closed state of a contact can be tested by connecting the test circuit 30 across a resistor in series with the contact.

The present disclosure describes several embodiments of the invention, however, the invention is not limited to these embodiments. Other variations are contemplated to be within the spirit and scope of the invention and appended claims.

What is claimed is:

1. A test circuit for indicating duration of a state of an electrical element having an alternating voltage of known frequency applied across the element, said test circuit comprising:

a rectifier connected to the element to rectify current from the alternating voltage so as to create current pulses that flow from the rectifier when the element is in the state being tested;

a pulse counter operatively connected to the rectifier to count the pulses; and an indicator connected to indicate a summation of pulses counted by the pulse counter as the duration of the state of the element.

2. A test circuit according to claim 1 wherein the element is a switch.

3. A test circuit according to claim 2 wherein the state of the switch being tested is the switch being open.

4. A test circuit according to claim 3 wherein the test circuit is connected across the switch.

5. A test circuit according to claim 4 further comprising a resistor connected in series with the switch.

6. A test circuit according to claim 1 further comprising a transformer having a primary winding connected across the element and a secondary winding connected to the rectifier.

7. A test circuit according to claim 1 further comprising an isolation circuit disposed between the element being tested and the pulse counter.

8. A test circuit according to claim 1 further comprising an optocoupler having an input connected to the rectifier and an output connected to the counter.

9. A test circuit according to claim 1 wherein the indicator includes a display for displaying the duration of the state of the element.

10. A test circuit according to claim 1 wherein the indicator includes a recorder for recording the duration of the state of the element.

11. A test circuit for determining duration of an open circuit across a switch having an alternating voltage of known frequency applied across the switch, said test circuit comprising:

a transformer having a primary winding connected across the switch and a secondary winding defining an output and a return;

a resistor connected to the output of the transformer;

a diode having an anode connected to the resistor;

an optocoupler having inputs connected across a cathode of the diode and the return;

a pulse counter connected across outputs of the optocoupler; and a display connected to display a summation of pulses counted by the pulse counter as the duration that the switch is open.

12. A washer comprising:

a motor connected to power washer operation;

a switch connected in parallel with the motor, having a state corresponding with operation of the motor, and adapted for having an alternating voltage of known frequency being applied across the switch and motor; and a circuit for testing duration of operation of the motor, said circuit comprising a transformer having a primary winding connected across the switch and a secondary winding defining a output and a return; a resistor connected to the output of the transformer; a rectifier connected to the resistor; a pulse counter connected to the rectifier; and a display connected to display summation of pulses counted by the pulse counter as the duration that the switch is open.

13. A washer according to claim 12 further comprising a power switch controlling the motor wherein the switch is connected to operate with the power switch.

14. A washer according to claim 13 wherein the switch is open when the motor is disconnected from the alternating voltage.

15. A washer according to claim 13 further comprising an optocoupler disposed between the rectifier and the pulse counter.

* * * * *